J. EATON.
MOTOR CONTROL.
APPLICATION FILED NOV. 9, 1916. RENEWED JAN. 25, 1919.
Patented Mar. 11, 1919.
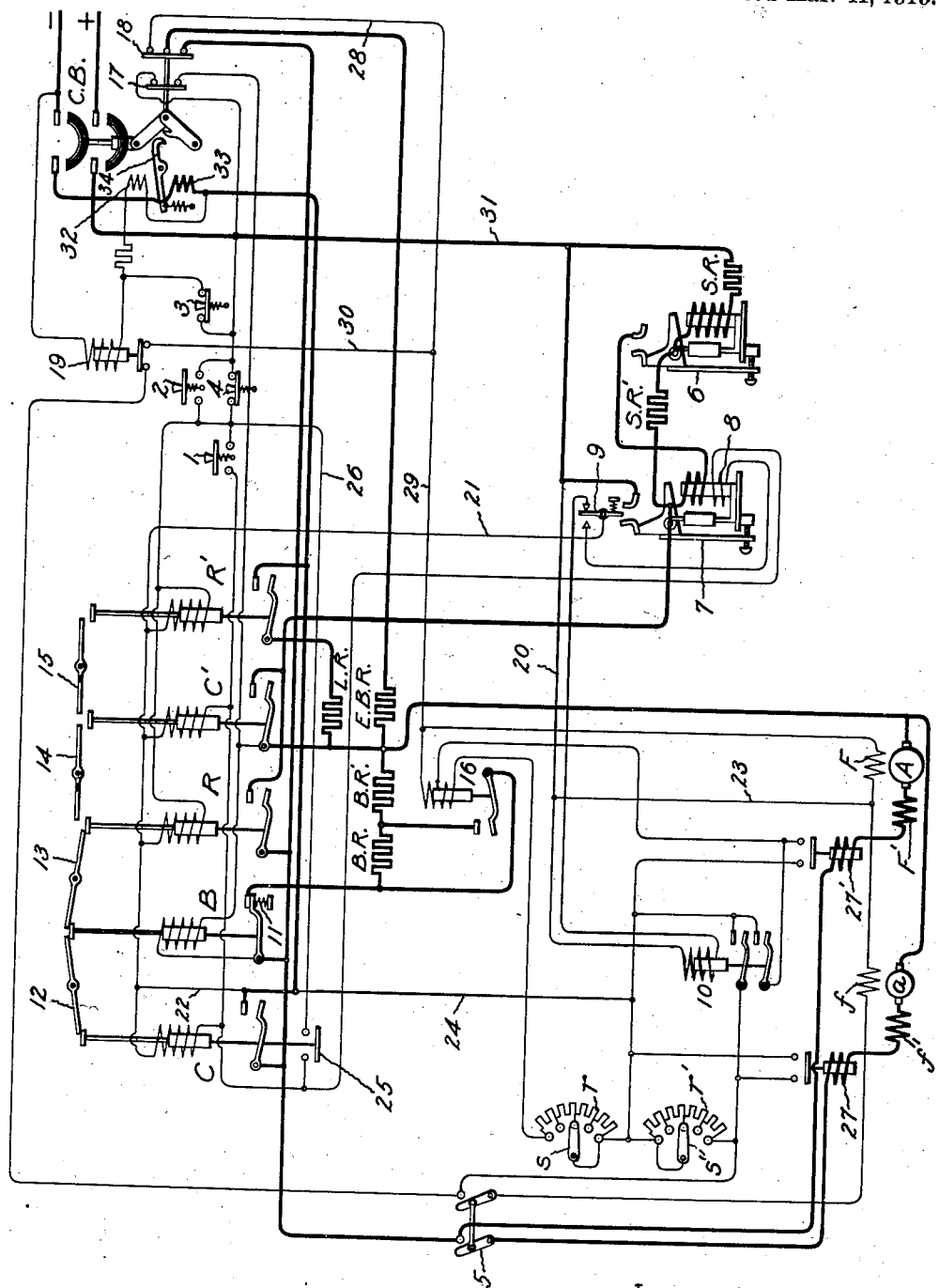
Inventor
John Eaton,
by Albert G. Davis
His Attorney.

UNITED STATES PATENT OFFICE.

JOHN EATON, OF SCHENECTADY, NEW YORK, ASSIGNOR TO GENERAL ELECTRIC COMPANY, A CORPORATION OF NEW YORK.

MOTOR CONTROL.

1,297,121.      Specification of Letters Patent.     Patented Mar. 11, 1919.

Application filed November 9, 1916, Serial No. 130,470. Renewed January 25, 1919. Serial No. 273,170.

*To all whom it may concern:*

Be it known that I, JOHN EATON, subject of the King of Great Britain, residing at Schenectady, county of Schenectady, State of New York, have invented certain new and useful Improvements in Motor Controls, of which the following is a specification.

My invention relates to the control of electric motors and it provides improved means whereby the motors may be started and stopped and generally controlled in a safe, reliable, and effective manner.

More specifically, my invention relates to the control of a plurality of mechanically independent electric motors which coöperate to produce a certain result and which must be coördinately started and stopped; that is, be started practically simultaneously and be brought to rest practically simultaneously although each motor drives a separate load. A particular instance of the necessity for such a control occurs in the electric drive for milling machines and the like, the motors of which are connected to drive separate coöperating parts of the machine, although in a certain limited degree the loads on the motors are interdependent. Such machines are ordinarily provided with a motor, called the "feed" motor, for advancing and withdrawing the work to and from the cutters as desired. Another motor called the "cutting" motor, is provided for rotating the cutters as the work is advanced toward the cutters by the feed motor. The cutting motor has usually the greater load and is ordinarily a much larger motor than the feed motor, and in order to get the best results from the operation of these motors, they are ordinarily required to have different speed-torque and other characteristics. They must also be provided with means for varying the relative speeds of the motors so as to vary the relative speeds of the feed mechanism and the coöperating cutters to accommodate the machine to various classes of work. These motors, although of different capacities and having mechanically independent rotating elements which drive coöperating parts of the machine at different speeds, must nevertheless be controlled in such a manner that they will coöperate perfectly at all times. They must be coördinated so as to start or stop practically simultaneously, since for instance, if the feed motor should start before or quicker than the cutting motor, the work would be advanced against the cutters, the cutter teeth would be broken off, and possibly the entire machine wrecked. The same result would happen if the feed motor should continue running after the cutting motor when it is desired to stop the machine, or if abnormal circuit conditions should occur, such as a failure of voltage or an overload on the motors causing the line circuit breaker to open.

One of the objects of my invention is to provide a control for a milling machine or the like whereby the driving motors will be coördinated so as to coöperate practically perfectly; that is, be started or stopped practically simultaneously at the will of the operator and be generally controlled so as to avoid the dangers which I have above pointed out. In carrying my invention into effect I provide a control for the feed and cutting motors of a milling machine whereby these motors may be simultaneously started and brought up to full running speed, and when the operator desires to stop the machine, the motor armatures operating in parallel will be automatically connected in a dynamic braking circuit, thus bringing the motors to rest simultaneously, the arrangement further providing that the motors will be automatically dynamically braked and brought to rest simultaneously more quickly in an emergency or upon the occurrence of abnormal circuit conditions. Furthermore, I provide a plurality of push buttons and automatic devices for controlling the motors so that there is practically no chance for the motors or the driven machine to be injured either by negligence on the part of the operator or by the occurrence of conditions which are beyond the operator's control. By merely pressing the proper one of the plurality of push buttons, the operator can control the operation of the machine as desired without danger to himself or the machine since the protective features are all automatically taken care of. Other objects and purposes of my invention will appear in the course of the following specification in which I have shown my invention embodied in concrete form for purposes of illustration.

Referring to the drawing which shows diagrammatically one embodiment of my invention, A represents the armature, F the shunt field and F' the commutating field of an electric motor for driving the cutters of a milling machine or the like, and $a$ represents the armature, $f$ the shunt field and $f'$ the commutating of an electric motor for driving the feed mechanism of the same machine. The cutting motor is directly connected to the cutters of the machine and its rotating element is mechanically independent of the rotating element of the feed motor which is directly connected to the feeding mechanism. The cutting motor is larger, has a greater capacity, is designed for a different range of speeds and has different speed-torque and other characteristics than the feed motor. The direction of rotation of these motors is controlled by four electromagnetic switches or contactors, two for each direction of rotation. Two of these switches are designated as C and C', respectively, for driving in the forward or cutting direction, while the other two switches, designated as R and R', respectively, when closed drive the machine in the opposite or "return" direction. These four switches are operated by shunt windings controlled by the push buttons 1, 2, 3, and 4. The push button 1 is provided for starting the motors simultaneously in the cutting direction, the push button 2 for starting the motors simultaneously in the reverse direction, the push button 3 for bringing the motors quickly to rest simultaneously in an emergency, and the push button 4 is provided for stopping the motors simultaneously when the operator desires to stop the machine temporarily for any reason.

In the drawing the parts are shown in the position they assume when the circuit breaker C. B. is open and all parts deënergized. The manual switch 5 is provided for operating the cutting motor alone or both the cutting motor and the feed motor together as desired. By moving this switch to the right the armature circuits and the shunt field circuits of the two machines are connected in parallel so that the movements of the two motors may be coördinated. With the switch 5 closed, when the line is energized by the closing of the circuit breaker C. B. and the push button 1 is pressed, the contactors C and C' are energized in parallel across the line and the two motors will be energized to start in the cutting direction simultaneously. Similarly, with the line energized, the motors may be simultaneously started in the opposite or return direction by pressing the push button 2 thereby energizing the windings of contactors R and R' across the line. The starting resistances S. R. and S R' are provided for both motors and these resistances are controlled by means of the contactors 6 and 7. These contactors are of the well known "series" type which have windings carrying the motor current and are held open until the current drops to a predetermined value, when they close and are held closed by magnetic force. The contactor 6 in closing short circuits the resistance S. R' and the contactor 7 in closing short circuits both sections of resistance and the coil of contactor 6, causing the contactor to open. Contactor 7 is maintained closed by means of a maintaining coil 8 energized across the line through an interlock 9 when the contactor and interlock 25 on contactor C close. When the motors are energized to operate in the return direction the limiting resistance L. R. is included in the armature circuit of the motors in addition to the starting resistances S. R. and S. R' so that the motors will have a low speed when operating in this direction since when it is desired to reverse the operation of the machine it is usually required that the parts of the machine move quite slowly.

For varying the speed of each motor independently of the speed of the other motor I have provided two rheostats, one of which is connected in the shunt field circuit of the cutting motor and has a resistance $r$ controlled by the arm $s$, while the other rheostat has a resistance $r'$ connected in the shunt field of the feed motor and controlled by the arm $s'$. When the motor is started these rheostats are short circuited by means of the relay 10, the coil of which is energized across the line through the interlock 9 associated with the series contactor 7. These shunt field rheostats will be short circuited until the series contactor 7 closes and moves the interlock 9 against its bias to open the coil circuit of relay 10 and include the portions of the resistances $r$ and $r'$ in the shunt fields of the cutting motor and the feed motor, respectively, as determined by the setting of the arms $s$ and $s'$. The operation of this interlock 9 is substantially the same as that described in my application Serial No. 817,365, filed Feb. 6, 1914, motor control systems, and assigned to the same assignee as this application.

In order to bring the motor armatures to rest simultaneously I provide a brake resistance through which the motor armatures are short circuited. This brake resistance is divided into two sections B. R. and B. R'. The purpose of these two sections of resistance is to graduate the dynamic braking current as the shunt field of the cutting motor builds up and the motors slow down. For making the dynamic braking connections I provide the contactor B. This contactor is normally held closed by means of a spring 11. The winding of this contactor is connected across the armatures of the two motors so that while the motors are operating the winding tends to close the switch but this tendency is opposed by one of the mechanical interlocks 12 or 13. The five contactors C, C', R, R', and B are arranged as shown in the drawing and are provided with four mechanical interlocks 12, 13, 14, 15, coöperating with the contactors so as to compel operation in a predetermined manner. The structure of these interlocks forms no part of my invention, but for purposes of illustration I shave shown them pivoted at their middle points and engaged by upwardly projecting stems of two adjacent contactors in the closed position. The operation of these bars is described in a previous United States Patent No. 1,041,845 issued to E. J. Murphy and myself, and will be sufficiently clear without further description. While the contactor B is closed by a spring this spring is not sufficiently stiff to apply any considerable pressure to the contacts hence electromagnetic means are provided for holding the contacts tightly closed.

The brake resistance B. R. is controlled by means of the electromagnetic switch or contactor 16 which is provided with a winding having one terminal connected to the shunt field of the cutting motor and the other end connected to the resistance $r$ in this shunt field circuit. The winding of this relay is divided into two halves which are differentially wound or opposed to each other, so that when the two halves are energized they neutralize each other and the relay will not close. It is obvious that when the relay 10 is open, the shunt field current of the cutting motor must pass through the two differential sections of the winding of this contactor and through any of the resistance $r$ which may be inserted in the field circuit to the negative side of the line. The contactor is therefore inoperative under this condition. When, however, the relay 10 is closed, the lower half of the winding of contactor 16 and the resistance $r$ are short circuited so that one half the winding is energized and the contactor becomes active. The winding of this contactor is so adjusted that when the field current approaches a maximum, that is, when the field F is nearly full strength the contactor will close, but when the field is weak the contactor will not close even though only one of the windings is energized. When the relay 10 closes, the field resistance $r$ is short circuited so as to strengthen the shunt field F of the cutting motor, but the field increases gradually due to the inductive effect and until the field current rises to the predetermined value, which is preferably near the maximum, the contactor 16 will not operate. When it does operate it short circuits a section of brake resistance B. R. The operation of this contactor is substantially the same as that of the relay 23 of the Patent #1,041,845 above mentioned, and it is thought that further description is unnecessary. This specific feature of my invention is broadly claimed in the United States patent to Brobst, No. 1,043,799.

In order to immediately stop the motors simultaneously in an emergency or upon the occurrence of abnormal circuit conditions such as the failure of voltage or an overload on the motors, I provide a circuit breaker C. B. which is so arranged as to apply an effective dynamic brake to the motors to bring the motors to rest simultaneously very quickly when the circuit breaker opens. To this end, in the particular form illustrated, I have provided two contacts 17 and 18 which move into and out of engagement with fixed contacts as the circuit breaker opens and closes. The contact 18 engages with three contacts, two of which close a dynamic braking circuit through the motor armatures and the emergency brake resistance E. B. R, while the other contact is connected with the shunt fields so as to include the shunt fields of the motors in parallel with the emergency brake resistance E. B. R. across the motor armatures. When the circuit breaker is open the circuit of the motor armatures is immediately closed through the resistance E. B. R. and the shunt fields of the motors are connected across the motor armatures in parallel with E. B. R., the arrangement being such that the rheostats in the shunt field circuits are excluded and the motors given full field excitation. The emergency brake resistance E. B. R. is less than the combined resistances of B. R. and B. R' so that the motors may be brought to rest simultaneously in the shortest possible time consistent with safety for the motors. The circuit breaker may be opened at any time by pressing the push button 3 and the emergency braking circuit will be made as above explained. The operation of this circuit breaker is substantially the same as that disclosed and claimed in my application Ser. No. 817,365, filed Feb. 7, 1914, and assigned to the same assignee as this application.

As thus constructed and arranged the operation of my device is as follows:

If it is desired that the feed motor and the cutting motor coöperate to drive the milling machine, the manual switch 5 is first closed, thus connecting the armatures and shunt field circuits of both motors in multiple. Preparatory to starting, the circuit breaker C. B. is closed, energizing the no-voltage release magnet of the circuit breaker and the coil of the relay 19, causing this relay to pick up its contacts. The relay 10 will also pick up and close its contacts, short circuiting the resistances $r$ and $r'$ in the shunt fields of the motors, the circuit for the coil of this relay being from the positive supply conductor, through conductor 20, interlock 9, conductor 21, conductor 22, to the negative supply conductor. The shunt fields of the motors are thus energized to full strength, the circuit for the fields being from the positive supply conductor through conductor 20, conductor 23, one path branching through shunt field F of the cutting motor, through the upper coil of differentially wound contactor 16, lower contact of relay 10, the other path branching through shunt field f of the feed motor, right hand contact member of switch 5 and upper contact of relay 10, both paths joining and passing through conductor 24 to the negative supply conductor. The relay 10 in closing short circuits the lower coil of the differentially wound contactor 16 and this contactor will close when the field F has built up to nearly the maximum strength. The closing of this contactor produces no effect on the motor at this time since the braking resistance is not included in the motor circuits. In order to start the motors simultaneously in the cutting direction, the push button 1 is now pressed, thus energizing the coils of the contactors C and C', causing these contactors to close and complete the circuit for the motor armatures, the circuit for the coils of these contactors being from the positive supply conductor through stop push button 4, push button 1, conductor 22, to the negative supply conductor. The contactor C in closing, closes an interlock 25 which completes a maintaining circuit for the coils of contactors C and C' through the conductor 26 exclusive of the push button 1, permitting this button to be released and the contactors nevertheless remain energized. The mechanical interlock 12 associated with the contactor C will open the normally closed contacts of dynamic brake contactor B and this contactor will be maintained open as long as the contactor C remains closed. When the contactors C and C' close, the coil of contactor B is energized in shunt to the armatures of the motors but it will not close when the counter E. M. F. of the motors builds up because of the restraining effect of interlock 12. The dynamic braking circuit is thus maintained open until it is desired that it shall be closed, as, for instance, when it is desired to stop the machine or when the voltage fails or in case the motors are overloaded. The two motors will simultaneously begin to rotate with full field and start the feed mechanism and cutters simultaneously in the "cutting" direction, the armature circuit for the motors being from the positive supply conductor, starting resistance S. R., coil of series contactor 6, starting resistance S. R', contact members of line contactor C', through the armature circuits of the two motors in multiple, contact members of contactor C, to the negative supply conductor. The motors will start at a rate of speed depending upon the amount of starting resistance. When the current taken by both motor armatures drops to a predetermined value, due to the speeding up of the motors, the series contactor 6 will close, thus short circuiting the starting resistance S. R' and simultaneously including the series coil of series contactor 7 in the motor armature circuit. When the armature current again drops to a predetermined value, the series contactor 7 will close, placing a short circuit around the starting resistances S. R. and S. R.', thus connecting the motor armatures directly across the source of supply. As the series contactor 7 closes, its contact member engages the interlock 9 and moves the interlock against its bias into engagement with its left hand contact, thereby opening the circuit of relay 10, causing the relay to drop its contacts and remove the short circuits from the shunt field resistances r and r', at the same time completing a circuit for maintaining coil 8 of the series contactor 7 through a circuit from the source of positive supply conductor, push button 4, conductor 26, interlock 25, interlock 9, conductor 21, conductor 22 to the negative supply conductor. The motors will then increase in speed depending upon the amount of the variable resistances r, r' in their shunt field circuits. The opening of the relay 10, removing the short circuit from the shunt fields resistances, included both of the coils of the contactor 16 in the circuit of the shunt field F of the cutting motor, and this contactor will be opened since the two coils of the contactor oppose each other. The speeds of the motors may be independently varied by means of the arms s and s' provided for varying the shunt field resistances. If at any time current in the armature circuits should exceed the predetermined values for which the series relays 27 and 27' included in the armature circuits of the feed and cutting motors, respectively, have been set, these relays will close their contacts and temporarily short circuit the resistances r and r', respectively, in the shunt fields of the motors, thus decreasing the speed of the motors and limiting value of their armature currents.

If it is desired to temporarily stop the machine, the push button 4 is pressed, thereby opening the coil circuits of the line contactors C and C' and the maintaining coil of series contactor 7, causing these contactors to open their switch members, disconnecting the motor armatures from the source of supply and removing a short circuit from the starting resistances S. R. and S R', preparatory to again starting the motors. As soon as the contactor C opens, the mechanical interlock 12 will no longer hold the dynamic brake contactor B open and this contactor will close in accordance with its bias to the closed position, thereby automatically connecting the motor armature circuits in multiple with the dynamic brake resistances B R and B R'. The coil of contactor B will be still connected in shunt to the motor armatures and will maintain the contactor closed as long as the armatures rotate. The opening of series contactor 7 causes the interlock 9 to be moved into engagement with its right hand contact member in accordance with its bias thus energizing the coil of relay 10 through a circuit previously described. The relay 10 will close its contact members, thereby completing a short circuit about the shunt field resistances r and r', and giving full field strength for the motors for a large dynamic braking effort. The lower contact member of relay 10 in closing not only short circuits the shunt field resistance r' in the field F of the cutting motor but also short circuits the lower coil of the differentially wound contactor 16. This contactor however will not close until substantially the full field current flows through the shunt field F, as previously explained, thus automatically providing a certain time interval before the resistance in the dynamic braking circuit is reduced. When the shunt field F has been built up to substantially its full strength, the motors will have decreased in speed considerably so that when the contactor 16 closes its contacts and short circuits the dynamic brake resistance B R, the retardation of the motors will be accomplished in a smooth and gradual manner. The motors are now operating as generators and send a dynamic braking current through the resistances B. R. and B R', and since their armatures and fields are electrically connected, the movements of the two armatures will be coördinated and the two motors will stop simultaneously.

By pressing the push button 1, the motors may be again started in the cutting direction in the same manner as previously described. If it is desired to reverse the motors to operate the machine in the return direction, the push button 2 is pressed thus energizing the reverse contactors R and R', completing the circuit for the motor armatures in a reverse direction through a circuit from the positive supply conductor, starting resistances S. R. and S. R', contact members of reverse contactor R, through the motor armatures in multiple, limiting resistance L. R., contact members of reverse contactor R' to the other negative supply conductor. The motors will accelerate as before, but in a reverse direction, but they will not come up to the normal speed because of the limiting resistance L. R. which is provided for giving a decreased speed for all the operations in the reverse direction. Reverse contactor R in closing likewise opens the contacts of dynamic brake contactor B through its mechanical interlock 13. The motors will continue to operate in the reverse direction only so long as the push button 2 is depressed, and as soon as the push button 2 is released, the motors are automatically included in the dynamic braking circuit previously described and automatically brought to rest simultaneously.

If an emergency occurs and it is desired that the motors and the control apparatus be entirely disconnected from the source of supply and that the motors be brought to rest simultaneously in a very short interval of time, the push button 3 is depressed thereby opening the circuit breaker C. B., disconnecting the motors and the control apparatus from the source of supply. As soon as the circuit breaker C. B. opens, its interlock 18 includes the motor armatures in an emergency dynamic braking circuit, the circuit for the armatures being from the interlock 18 through the emergency brake resistance E. B. R., through both motor armatures in multiple back again to the interlock 18. Depressing the safety stop push button 3 not only causes the line switch to open but also deënergizes the coil of relay 19, causing this relay to drop its contacts and connect the fields of the motors in shunt to their armatures, the circuit being from one side of the armature circuit at the interlock 18 of C. B. through conductor 28 to a shunt circuit, one path of which is through the conductor 29, shunt field F, the other shunt path being through the conductor 30, contacts of relay 19, right hand switch member of manual switch 5, shunt field f, joining the other shunt path and passing through the conductor 23, conductor 20, conductor 31 through the interlock 17 of C. B. to the other end of the emergency dynamic brake resistance E. B. R., thereby connecting the shunt fields in multiple to their armatures across the resistance E. B. R. through circuits exclusive of the shunt field rheostats. The motors will thereby be included in an emergency dynamic braking circuit and will have the greatest dynamic braking effort consistent with the capacity of the motors. The motors will be brought to rest simultaneously as before but more quickly.

With the motors running in either the forward or reverse direction, if at any time the source of supply should fail, the no-voltage release magnet 32 of the circuit breaker of C. B. will be deënergized and the circuit breaker will be caused to open. An overload on the motors will likewise cause the circuit breaker to open by means of the overload coil 33 releasing the catch 34. The opening of the circuit breaker from any cause will automatically complete the emergency dynamic braking circuit heretofore explained in connection with the operation described after pressing the safety stop push button 3.

If it is desired to operate the cutting motor alone and feed the work to the cutters manually, the switch 5 is opened thus disconnecting the armature and field of the feed motor F. M. from the source of supply. The cutting motor may then be operated in the same manner as that explained in connection with the operation of the two motors together.

What I claim as new and desire to secure by Letters Patent of the United States, is:—

1. The combination with a plurality of coöperating electric motors connected to separate loads, of means for automatically bringing the motors to rest simultaneously comprising a dynamic braking circuit supplied with current from both motor armatures.

2. The combination with a plurality of coöperating electric motors of different capacities connected to a source of supply and driving separate loads of different values at different speeds, of means for automatically bringing the motors to rest simultaneously, comprising a dynamic braking circuit supplied with current from the motor armatures operating in multiple.

3. The combination with a plurality of motors having mechanically independent rotating elements connected to coöperating parts of a machine, of means for automatically bringing the motors to rest simultaneously comprising a dynamic brake resistance connected to the motor armatures operating in multiple.

4. The combination with a plurality of motors of different capacities driving coöperating parts of a machine, the said motors having separate loads of different values, of means for automatically bringing the motors to rest simultaneously comprising a dynamic braking circuit supplied with current from the motor armatures operating in multiple.

5. The combination with a plurality of coöperating electric motors having mechanically independent rotating elements driving separate loads, of means for varying the relative speeds of the motors, and means for stopping the motors simultaneously comprising a dynamic braking circuit supplied with current from the motor armatures.

6. The combination with a plurality of coöperating shunt wound motors connected to separate loads, of means for connecting the motors to a source of supply to start the loads simultaneously, and means for disconnecting the armatures and shunt fields of the motors from the source of supply and automatically connecting said fields and armatures in parallel with a resistance to dynamically brake the motors and bring them to rest simultaneously.

7. The combination with a plurality of different capacity motors having shunt fields, the said motors connected in parallel to a source of supply and driving separate loads of different values consisting of coöperating parts of a machine, of a resistance for dynamically braking the motors, and means for disconnecting the motor armatures from the source of supply and automatically connecting said armatures in parallel with the resistance to dynamically brake the motors and bring the coöperating parts of the machine to rest simultaneously.

8. The combination with a plurality of coöperating electric motors each of which drives a separate load, of means for connecting the motors to a source of supply to start them simultaneously, means for connecting the motors in a dynamic braking circuit to bring them to rest simultaneously, and means whereby upon the occurrence of abnormal circuit conditions the motors will be automatically disconnected from the source of supply and included in another dynamic braking circuit to bring them simultaneously to rest more quickly.

9. The combination with a plurality of coöperating electric motors having shunt fields, each of the motors driving a separate load, of means comprising a plurality of push buttons for starting, stopping and reversing the motors, means including one of said push buttons for connecting the motors to a source of supply, means including another of said push buttons for disconnecting the motor armatures from the source of supply and automatically including a dynamic braking resistance in the circuit of the motor armatures operating in parallel to bring the motors to rest simultaneously, means including another of said push buttons for disconnecting the fields and armatures of said motors from the source of supply and automatically connecting said fields and armatures in parallel with another resistance of less value to dynamically brake the motors and bring them simultaneously to rest more quickly.

In witness whereof, I have hereunto set my hand this 8th day of November, 1916.

JOHN EATON.